United States Patent [19]

Matsuo

[11] Patent Number: 4,629,665

[45] Date of Patent: Dec. 16, 1986

[54] CYLINDRICAL BATTERY
[75] Inventor: Setsuo Matsuo, Sumoto, Japan
[73] Assignee: Sanyo Electric Co., Ltd., Japan
[21] Appl. No.: 574,560
[22] Filed: Jan. 27, 1984
[30] Foreign Application Priority Data Feb. 7, 1983 [JP] Japan .......................... 58-17132[U]
Jun. 3, 1983 [JP] Japan .......................... 58-85533[U]
Jul. 13, 1983 [JP] Japan ......................... 58-109159[U]

[51] Int. Cl.⁴ .................. H01M 2/02; H01M 2/12
[52] U.S. Cl. ........................... 429/164; 429/165;
429/166; 429/82; 429/86
[58] Field of Search ............ 429/164, 165, 166, 171,
429/53–56, 82, 86

[56]     References Cited
U.S. PATENT DOCUMENTS 3,622,392 11/1971 Larsen et al. ..................... 429/82
3,664,878  5/1972 Amthur ............................. 429/54
3,740,271  6/1973 Jammet ........................... 429/165
3,787,243  1/1974 Zaleski ........................... 429/164
4,042,761  8/1977 Nabiullin ......................... 429/165
4,075,398  2/1978 Levy ................................ 429/56
4,191,806  3/1980 Levy ................................ 429/56
4,484,691 11/1984 Lees ............................. 429/56 X Primary Examiner—Brian E. Hearn
Assistant Examiner—Stephen J. Kalafut
Attorney, Agent, or Firm—Darby & Darby

[57]        ABSTRACT

A cylindrical battery provided with a battery case acting also as one polarity terminal with a cylindrical one polarity electrode disposed inside, and another polarity terminal member connected electrically with a lead plate to another polarity electrode installed through a cylindrical separator in a hollow zone of said one polarity electrode, which comprises providing an annular descending wall placed closely upon a top opening inside peripheral edge of said cylindrical separator on the lower surface of an annular insulating packing for insulating the battery case and said another polarity terminal member, preventing the battery capacity reduction due to self-discharge.

6 Claims, 12 Drawing Figures

CYLINDRICAL BATTERY

BACKGROUND OF THE INVENTION

1. Field of the Invention

This invention relates to a cylindrical battery assembled to have cylindrical positive and negative electrodes disposed concentrically through a separator (for example an organic electrolyte battery, alkaline zinc battery or the like) and particularly concerns a cylindrical battery structure improved for preventing capacity reduction due to self- discharge.

2. Description of the Prior Art

A reduction in capacity of this kind of battery due to self-discharge is caused, in most cases, by a phenomenon wherein one electrode swells and disintegrates partially to release a powder of the electrode material during the use of the battery and the powder comes in contact with the other electrode across the end edge of a separator interposed between both positive and negative electrodes when the battery is subjected to shock or oscillation or used upside down.

To avoid such reduction in capacity of the battery, there is made a contrivance various ways hitherto. An organic electrolyte battery is disclosed in Japanese Utility Model Publication No. 51495/1982 laid open prior to application of this invention, discloses conventional examples in FIGS. 1 to 3 and an example of the above Utility Model in FIG. 4. In FIGS. 1 to 4, 1, 1C and 1D denote cylindrical positive electrodes obtained through molding a positive electrode material, and 2A, 2B, 2C and 2D denote battery cases acting also as positive electrode terminals with the above cylindrical positive electrodes disposed inside, 3A, 3B, 3C and 3D denote cylindrical separators, 4A, 4B, 4C and 4D denote negative electrodes disposed in hollow zones of the above positive electrodes through the cylindrical separators, 5A, 5B, 5C and 5D denote negative electrode collecting cylinders, 6A, 6B, 6C and 6D denote negative electrode collectors, 7A, 7B, 7C and 7D denote battery case covers acting also as negative electrode terminals connecting electrically to the above negative electrodes through the above negative electrode collecting cylinders and negative electrode collectors 8A, 8B, 8C and 8D denote annular insulating packings for insulating the above battery cases and battery case covers.

The battery shown in FIG. 1 has a ring type insulating washer 9 disposed on an upper end of the cylindrical positive electrode 1A, which is to prevent a reduction in capacity of the battery due to self-discharge caused by the powder of the electrode material released from a positive electrode by partial disintegration of said electrode coming in contact with the negative electrode 4A side. However, when the positive electrode 1A is swelled according to discharge, the insulating washer 9 is easily pushed upward, therefore a movement of the powder cannot be prevented thoroughly. Further, since the insulating washer 9 and the insulating packing 8A are made separately, parts run many in number, which entails a complicatedness of working efficiency for assembling and a loss in volume of the insulating washer in the battery.

In the battery shown in FIG. 2, a ring type insulating washer 10 is separated upward from an upper end of the cylindrical positive electrode 1B and provided in contact with a lower surface of the insulating packing 8B. In this case, however, the insulating packing 8B cannot be fastened thoroughly, which is capable of causing a leakage. Furthermore, since the insulating washer 10 and the insulating packing 8B are made separately, parts run many in number, which entails a complicatedness of working efficiency for assembling and a loss in volume of the insulating washer in the battery as in the case of the battery given in FIG. 1.

The battery shown in FIG. 3 has the separator 3C extended as far as it comes in contact with the battery case cover 7C, however, it is difficult to keep an upper end peripheral edge of the separator 3C totally in contact with a lower surface of the battery case cover 7C, therefore the positive electrode material powder cannot be prevented thoroughly from moving to the negative electrode.

Then, the battery shown in FIG. 4 is provided with the insulating packing 8D having a collar 11, and an upper end of the separator 3D is inserted in a hole formed of a circular edge 12 of the collar 11 and smaller in diameter than the upper end outside diameter of the separator. In this case, however, the upper end of the separator 3D is constricted to produce creases on the side, which involves a difficulty in bringing into contact closely with the circular edge 12, and thus the positive electrode material powder cannot be prevented thoroughly from moving to the negative electrode, too.

This invention has been made to overcome the above problems.

SUMMARY OF THE INVENTION

This invention provides a cylindrical battery having a battery case acting also as one polarity terminal with a cylindrical one polarity electrode disposed inside, and another polarity terminal member connected electrically with a lead plate to another polarity electrode installed through a cylindrical separator in a hollow zone of said one polarity electrode, which comprises providing an annular descending wall placed closely upon a top opening inside peripheral edge of the cylindrical separator on the lower surface of an annular insulating packing for insulating the battery case and said another polarity terminal member.

As mentioned above, the battery of this invention is characterized in that the annular descending wall extending downward from the lower surface of the annular insulating packing is placed closely upon a top opening inside peripheral edge of the cylindrical separator. Then, both the two are placed closely upon each other in facial contact, therefore a powder of the one electrode material can be prevented from contacting the other electrode to cause a self-discharge.

Further, the invention comprises a battery for which the descending wall is placed closely upon the top opening inside peripheral edge of the cylindrical separator and further both are fixed continuously or discontinuously through, for example, thermal welding. Thus a powder of the one electrode material can further be prevented from contacting the other electrode to cause a self-discharge.

The invention further comprises a battery for which one or more of gas purging holes or notches are provided within the plane where the annular descending wall is placed upon the top opening inside peripheral edge of the cylindrical separator. This battery is effective to have a self-discharge prevented as in the case of the above-mentioned battery, and also a permeation of an organic electrolyte into the separator smoothed, as described in detail hereinafter, by providing the above holes or notches, thus shortening the time for electrolyte saturation and also improving a working efficiency for assembling the battery.

DETAILED DESCRIPTION OF THE PREFERRED EMBODIMENT

An organic electrolyte battery given by way of a battery of this invention will now be described with reference to the accompanying drawings.

Figure 1:
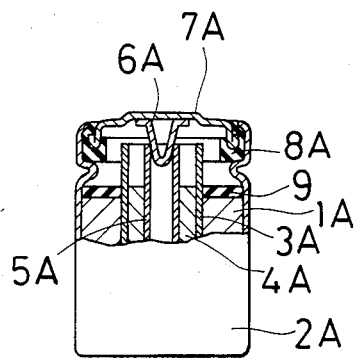
FIG. 1 to FIG. 4 are longitudinal sectional view of a conventional type of cylindrical battery.
Figure 2:
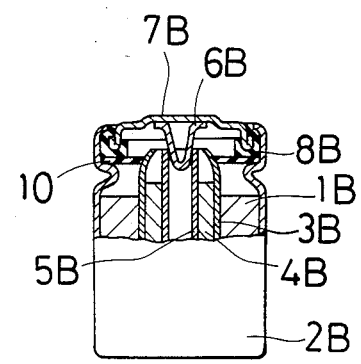
Figure 3:
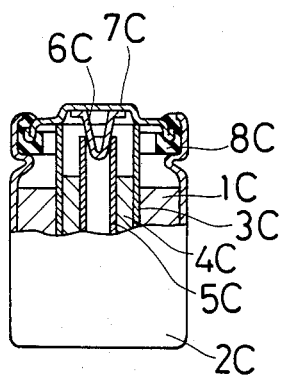
Figure 4:
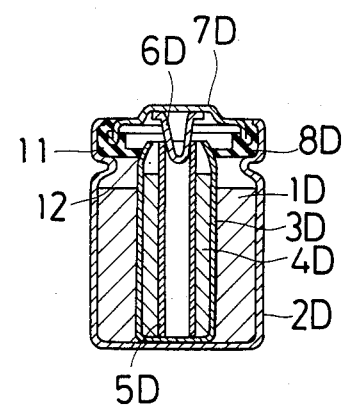
Figure 5:
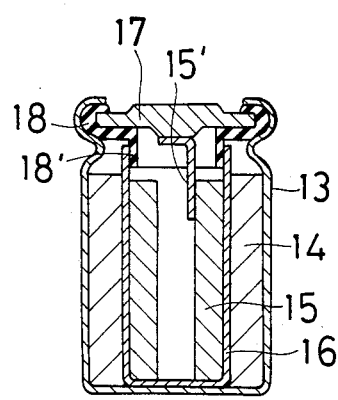
FIG. 5, FIG. 6 and FIG. 9 are longitudinal sectional views of batteries given in embodiment of this invention.

FIG. 5 is a longitudinal sectional view of a battery given in one embodiment of this invention. In FIG. 5, 13 denotes a battery case acting also as a positive electrode terminal. On its inside surface, there is disposed a cylindrical positive electrode 14 obtained through molding a positive electrode material which includes manganese dioxide as an active material (for example, manganese dioxide/graphite of conductive material/polytetrafluoroethylene resin of binding agent in 85:10:5 parts by weight). A reference numeral 15 denotes a lithium negative electrode disposed in a hollow zone of the positive electrode 14 through a cylindrical separator 16 (nonwoven fabric of polypropylene fiber, for example), and an end of a negative electrode lead plate 15' is fixed by spot welding on the lower surface of a battery case cover 17 acting also as a negative electrode terminal. A solution prepared by dissolving lithium perchlorate (1M concentration) in a mixture of equal volumes of propylene carbonate and dimethoxyethane is used as an electrolyte in the battery. Then, 18 denotes an annular insulating packing (polypropylene, propylene-ethylene copolymer, hard synthetic rubber or the like) for insulating the battery case 13 acting also as a positive electrode terminal and the negative electrode terminal member 17, and an annular descending wall 18' is formed on its lower surface. The descending wall 18' is placed closely upon a top opening inside peripheral edge of the cylindrical separator 16.

Figure 6:
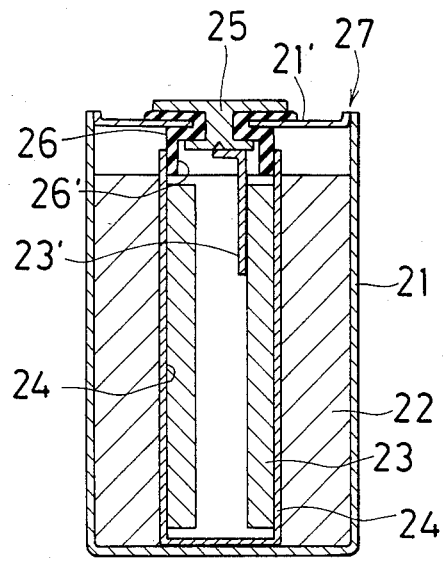

FIG. 6 is a longitudinal sectional view of a battery given in another embodiment of this invention. What is different from the battery of FIG. 5 is that a battery case 21 and a case cover 21' are fixed at an end edge 27 through laser welding and that a negative electrode terminal member 25 is passed and fixed through a center hole of the case cover 21' by way of an annular insulating packing 26 formed by insert molding. An annular descending wall 26' is formed on a lower surface of the annular insulating packing 26, and this wall is placed closely upon a top opening inside peripheral edge of the cylindrical separator 24 as in the case of the battery of FIG. 5. Numerals 22, 23 and 23' denote a positive electrode, a negative electrode and a negative electrode lead plate respectively as in the case of the battery of FIG. 5.

Next, an assembling method for the battery of this invention will be described with reference to the battery given in FIG. 6.

Figure 7:
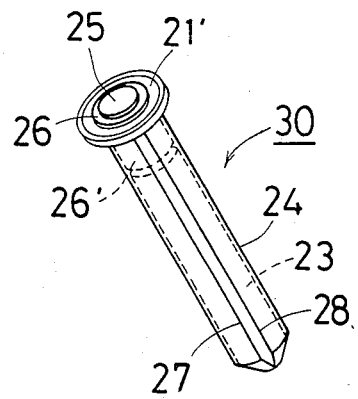
FIG. 7 and FIG. 10 are perspective views of an operative example of a negative electrode member used for this invention.

The negative electrode terminal member 25 is passed and fixed through the case cover 21' by way of the annular insulating packing 26 with the annular descending wall 26' which is formed by insert molding in the center hole of the case cover 21'. Then, the lower surface of the terminal member 25 and the cylindrical negative electrode 23 are connected through the negative electrode lead plate 23'. Next, a negative electrode member 30 shown in FIG. 7 is fabricated by mounting the separator thereto according to the following two methods.

(i) A separator sheet broader in width than the length of the negative electrode is wound on the outside of the negative electrode 23 and the descending wall 26', and both the end edges are placed upon each other.

Next, the overlap is thermally welded to a cylindrical form and the lower end is twisted to a bag form, thereby fabricating a negative electrode member 30. (In FIG. 7, 27 denotes an end edge of the separator sheet, and 28 indicates a welding line.) Then, an upper end of the separator overlap is welded on the descending wall 26' by the welding. The above welding can easily be done as it will be carried out on outside of the separator sheet which is kept placed upon the hard descending wall 26' and the negative electrode 23.

Figure 8:
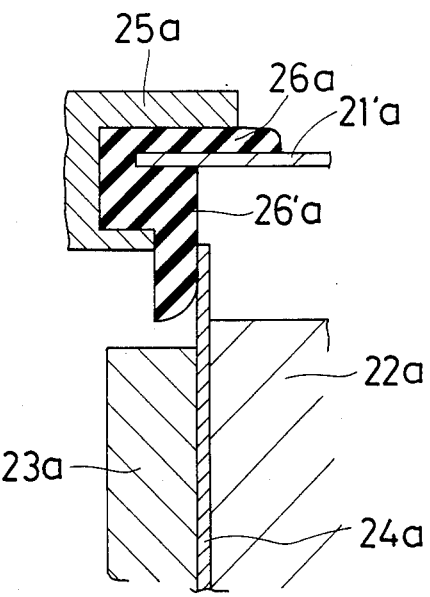
FIG. 8 is an enlarged view of one example of the portion whereat a descending wall of an insulating packing of the battery according to this invention is placed upon the top opening inside peripheral edge of a separator.

(ii) The negative electrode member 30 is fabricated by inserting the negative electrode 23 and the descending wall 26' in a top opening of the separator prepared in a bottomed bag form beforehand. In this case, both the two can be placed closely upon each other by insertion with an outside diamether of the descending wall 26' taken somewhat larger than an inside diameter of the cylindrical separator 24. Further, the lower end of a descending wall 26'a will be formed in circular arc at the side where it is placed upon an inside surface of a cylindrical separator 24a as shown in FIG. 8, which is available to inserting the descending wall 26'a in an opening of the cylindrical separator 24a.

The negative electrode member prepared as above is inserted in the hollow zone of the cylindrical positive electrode 22 installed in the battery case 21 beforehand with a necessary quantity of electrolyte poured therein, the end edge 27 is then welded and sealed hermetically.

In the batteries of FIG. 5 and FIG. 6, the positive electrode is disintegrated partly for swelling during use of the batteries and is capable of producing a powder of the positive electrode material. However, since the annular descending wall provided on the lower surface of the insulating packing is placed closely upon the top opening inside peripheral edge of the cylindrical separator as described above, the powder is prevented from coming in contact with the negative electrode across the upper end edge of the cylindrical separator when battery is subjected to shock or used upside down, and thus a reduction in capacity due to self-discharge can be prevented. For the cylindrical separator in this connection, that of allowing gas and liquid to pass but hardly or never allowing the above powder of the positive electrode material is used.

Figure 9:
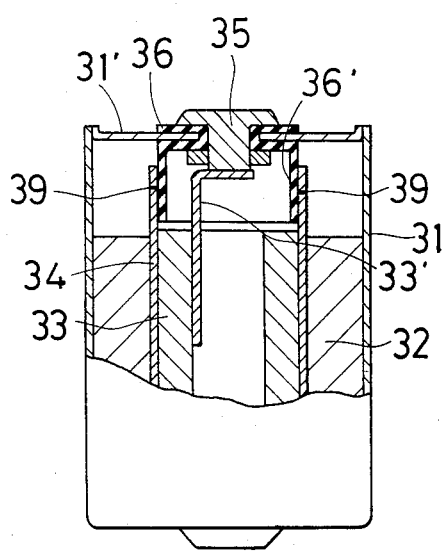

FIG. 9 is a longitudinal sectional view of a battery given in another embodiment of this invention. What is different from that of FIG. 6 is that the battery of FIG. 9 has a part 39 of the close overlap of a cylindrical separator 34 and a descending wall 36' on the lower surface of an insulating packing 36 fixed by thermal welding. This battery can be assembled according to the above-mentioned method (i) or (ii) likewise, and a perspective view of a negative electrode member 40 fabricated according to the method (i) is given in FIG. 10.

In the case of battery of this embodiment, the descending wall 36' of the insulating packing and the cylindrical separator 34 are fixed securely enough as mentioned above, therefore the positive electrode and the negative electrode can be isolated securely in the battery, a moving of the powder of the positive electrode material to the negative electrode can be suppressed effectively further, and thus a reduction in capacity due to self-discharge can be prevented reasonably. Further as compared with a conventional battery, number of necessary parts can be decreased, and a battery assembling work can be simplified.

Figure 10:
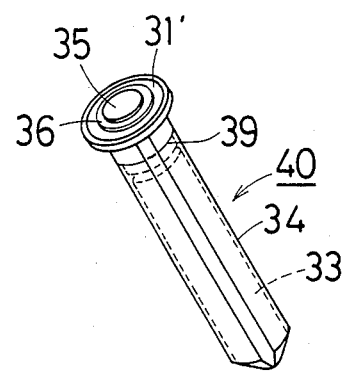

It is then preferable that the close overlap is fixed continuously in ring form as shown in FIG. 10, however, it can be fixed intermittently otherwise, and even in the case of the latter, the moving of the powder of the positive electrode material can be prevented thoroughly.

Figure 11:
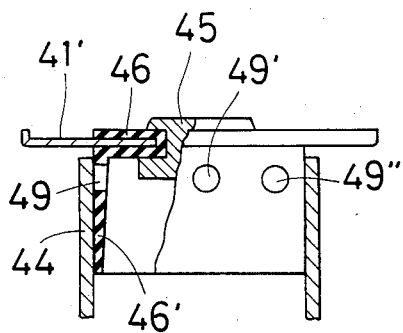
FIG. 11 and FIG. 12 are fragmentary sectional views illustrating how an insulating packing used for an operative example of the battery according to this invention is mounted.

Next, FIG. 11 represents further embodiment of an annular insulating packing 46 formed the center hole of a case cover 41' through insert molding with a negative electrode terminal member 45 passed and fixed therein. What is different from that of the battery of FIG. 6 is that the packing has one or more of gas purging holes 49, 49', 49" provided within the plane where the packing's descending wall 46' is placed upon cylindrical separator 44. The battery of this invention which is identical to that of FIG. 6 except using insulating packing 46 has advantages similar to the batteries of FIG. 5 and FIG. 6 as compared with the conventional one and is also advantageous at the time of battery assembling as pointed out below.

This battery can also be assembled according to a method similar to the two methods described for the battery of FIG. 6. According to the method (i) for example, a negative electrode member similar to the negative electrode member 30 of FIG. 7 is first fabricated likewise except for using an insulating packing 46 of FIG. 11. On the other hand, a cylindrical positive electrode is installed in the battery case, a necessary quantity of electrolyte is poured in the hollow zone thereof, and then the above negative electrode member is inserted in the hollow zone of the positive electrode. At the time of insertion, an internal gas of the negative electrode member passes the overlap of the holes and the separator and is quickly discharged to an external space of the negative electrode member, therefore an internal space of the separator can be saturated smoothly with an organic electrolyte, and thus the organic electrolyte is quickly supplied to the negative electrode side positioned in the separator hollow zone, which is effective for shortening the time for immersion and also improving the efficiency of assembling.

Figure 12:
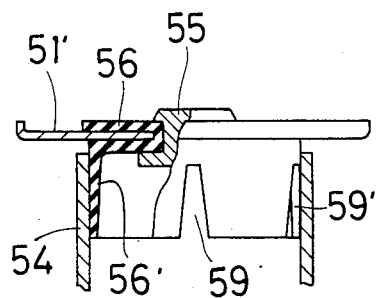

Further, FIG. 12 represents another embodiment of an annular insulating packing(56) having notches (59, 59') instead of the holes 49, 49' and 49" such shown in FIG. 11. This packing(56) also has the same effect as that of the packing(46) in FIG. 11.

What is claimed is:

1. A cylindrical battery comprising:
   a battery case for providing a battery terminal of a first polarity;
   a cylindrical first polarity electrode having a hollow zone therein, said first polarity electrode being disposed within said battery case and electrically coupled thereto;
   an electrolyte disposed within said battery case; and
   a second polarity member being disposed within said hollow zone, said second polarity member comprising an assembly of a second polarity terminal, a lead plate, a second polarity electrode electrically coupled to said terminal via said lead plate, a cylindrical gas porous separator enveloping said second polarity electrode and having a top opening with an inside peripheral surface extending past an end of said second polarity electrode and an annular insulating packing means having an annular descending wall disposed upon said separator top opening inside peripheral surface;
   wherein said annular descending wall includes permanently open unobstructed apertures within a region where said annular descending wall is disposed on said separator inside peripheral surface for the release of gas from said second polarity member during battery assembly.

2. A cylindrical battery comprising:
   a battery case for providing a battery terminal of a first polarity;
   a cylindrical first polarity electrode having a hollow zone therein, said first polarity electrode being disposed within said battery case and electrically coupled thereto;
   an electrolyte disposed within said battery case; and
   a second polarity member being disposed within said hollow zone, said second polarity member comprising an assembly of a second polarity terminal, a lead plate, a second polarity electrode electrically coupled to said terminal through said lead plate, a cylindrical gas porous separator enveloping said second polarity electrode and having a top opening with an inside peripheral surface extending past an end of said second polarity electrode and an annular insulating packing means having an annular descending wall disposed upon said separator top opening inside peripheral surface;
   wherein said annular descending wall includes permanently open obstructed apertures within a region where said annular descending wall is disposed on said separator inside peripheral surface;
   whereby internal gas existing in said second polarity member passes through said open unobstructed apertures and is vented externally to said first polarity member.

3. The battery according to claim 1 wherein said apertures are circular holes.

4. The battery according to claim 1 wherein said apertures are notches.

5. The battery according to claims 1, 3 or 4 wherein said annular descending wall is disposed closely upon said separator top opening inside peripheral edge and fixed continuously thereto.

6. The battery according to claims 1, 3 or 4 wherein said annular descending wall is disposed closely upon said separator top opening inside peripheral edge and fixed discontinuously thereto.

* * * * *